United States Patent [19]

Yamazaki et al.

[11] 4,154,886

[45] May 15, 1979

[54] LINER SHEET CONTAINING A LUBRICANT AND AN ANTISTATIC AGENT FOR MAGNETIC TAPE CARTRIDGE AND METHOD FOR ITS PRODUCTION

[75] Inventors: Yasuyuki Yamazaki; Susumu Norota, both of Iwakuni, Japan

[73] Assignee: Teijin Limited, Osaka, Japan

[21] Appl. No.: 920,543

[30] Foreign Application Priority Data

Aug. 9, 1977 [JP] Japan .......................... 42-94643

[22] Filed: Jun. 29, 1978

[51] Int. Cl.$^2$ .................. B32B 5/26; B32B 27/02; B32B 33/00; F16N 15/00
[52] U.S. Cl. ...................................... 428/200; 118/77; 156/164; 156/244.27; 156/281; 156/306; 156/324; 184/1 E; 184/16; 184/102; 264/238; 264/288; 264/DIG. 47; 428/286; 428/287; 428/288; 428/289; 428/293; 428/302; 428/317
[58] Field of Search .................. 427/48, 129, 131; 156/164, 244, 281, 306, 324; 264/238, 288, DIG. 47; 428/220, 286, 287, 288, 289, 293, 302, 317; 118/77; 184/1 E, 16, 102

[56] References Cited

U.S. PATENT DOCUMENTS

| 2,355,003 | 8/1944 | McCann | 184/16 |
|---|---|---|---|
| 2,426,838 | 9/1947 | Miller | 118/77 |
| 3,130,933 | 4/1964 | Pillsburg et al. | 118/77 |
| 3,319,012 | 5/1967 | Reed et al. | 118/77 |
| 3,993,824 | 11/1976 | Shirahato et al. | 427/131 |
| 4,091,158 | 5/1978 | Kasuga et al. | 427/131 |

FOREIGN PATENT DOCUMENTS 604483  5/1960  Italy ............................................ 184/16

*Primary Examiner*—J.C. Cannon
*Attorney, Agent, or Firm*—Sherman & Shalloway

[57] ABSTRACT

A liner sheet for a magnetic tape cartridge, said sheet being a fibrous sheet containing thermoplastic synthetic fibers with at least those fibers which are in its surface layer being bonded as a result of heat melting, said fibrous sheet having (1) an apparent specific gravity 0.55 to 0.85 time the specific gravity of the polymer constituting the fibers, (2) air permeability expressed by a pressure drop of not more than 200 cm Aq/mm when air is caused to flow at a speed of 10 cm/sec in a direction perpendicular to the surface of the sheet and (3) a thickness of 50 to 300 microns, and said fibrous sheet containing in its structure a lubricant and an antistatic agent dispersed therein. The liner sheet can be produced by interposing a fibrous sheet containing thermoplastic synthetic fibers and having the antistatic agent applied thereto between fibrous sheets containing thermoplastic synthetic fibers and having the lubricant applied thereto, and hot-pressing the resulting laminate to melt-bond at least those fibers which are in the surface layer of the laminate; and has superior abrasion resistance, a high level of a lubricating surface, antistatic properties and the ability to reduce noises which occur during running of a magnetic tape.

11 Claims, 4 Drawing Figures

LINER SHEET A LUBRICANT AND AN ANTI-STATIC AGENT FOR MAGNETIC TAPE CARTRIDGE AND METHOD FOR ITS PRODUCTION

This invention relates to a liner sheet which is suitable for use in a magnetic tape cartridge and has superior abrasion resistance, a high level of a lubricating surface, antistatic properties and the ability to reduce noises which occur during running of a magnetic tape; and to a method for its production.

Packing material, known as a shim, which has been used heretofore to fill a space between a rotating body and another part in electronics devices, acoustical devices, etc., is required to have a high lubricating property. As a material suitable for making a shim, a liner sheet produced by applying a highly lubricating substance such as wax or graphite to a paper or a fluorocarbon resin as a substrate by coating, impregnation, or dispersion was suggested. The paper used as substrate is sensitive to moisture, quite lacks dimensional stability, and has poor abrasion resistance. The liner sheet produced from the fluorocarbon resin as a substrate requires a very inefficient step of forming films, that is, the "shaving[ step. Thus, its cost is not competitive. Furthermore, such a film-like sheet tends to generate high noises on contact with a rotating body when used in an acoustic device. To make the liner sheet in a porous structure will be effective for removing this defect, and a non-woven fabric is considered as suitable for achieving such a structure. However, ordinary non-woven fabrics cannot be used as a shim because they have a high coefficient of friction and a high electrical resistance conducive to static buildup, and tends to develop naps by friction.

It is an object of this invention therefore to provide a liner sheet of a low coefficient of friction, which can replace the conventional liner sheets of paper or fluorocarbon resin, by utilizing a process for producing a non-woven fabric containing thermoplastic synthetic fibers at low cost.

The above object can be achieved in accordance with this invention by a liner sheet for a magnetic tape cartridge, said sheet being a fibrous sheet containing thermoplastic synthetic fibers with at least those fibers which are in its surface layer being bonded as a result of heat melting, said fibrous sheet having (1) an apparent specific gravity (to be sometimes referred to hereinbelow as "specific gravity ratio") 0.55 to 0.85 time, preferably 0.60 to 0.80 time, the specific gravity of the polymer constituting the fibers, (2) air permeability expressed by a pressure drop (to be sometimes referred to hereinbelow as "air flow resistance") of not more than 200 cm Aq/mm, preferably not more than 150 cm Aq/mm, when air is caused to flow at a speed of 10 cm/sec in a direction perpendicular to the surface of the sheet and (3) a thickness of 50 to 300 microns, and said fibrous sheet containing in its structure a lubricant and an antistatic agent dispersed therein, preferably containing the lubricant maintaly at its surface layer and the antistatic agent mainly in its inner layer. Desirably, the fibrous sheet contains in its structure 1to 20% by weight, preferably 2to 15% by weight of the lubricant, and 0.1 to 10% by weight, preferably 0.5 to 3% by weight of the antistatic agent, based on the weight of the fibrous sheet.

The liner sheet of this invention described above can be produced by interposing a fibrous sheet containing thermoplastic synthetic fibers and having an antistatic agent applied thereto between fibrous sheets containing thermoplastic synthetic fibers and having a lubricant applied thereto to form a laminate of sandwich structure, and hot-pressing the laminate so that at least those fibers which are in its surface layer are bonded by heat melting and it attaines the aforesaid specific gravity ratio (1), air flow resistance (2) and thickness (3).

The liner sheet of this invention has a very low coefficient of friction because the lubricant is present in its surface layer which has been smoothed as a result of bonding by heat melting. Furthermore, the effect of the lubricant is long-lasting because the lubricant is confined within the thermoplastic synthetic fibers which have been bonded by melting.

When the laminate of fibrous sheets is heat-melted to bond the fibers, fibers in its inner layer are naturally entangled with fibers in its surface layer, and a part of the antistatic agent present originally in the inner layer migrates to the vicinity of the surface by the effect of heat and reaches fine depressions formed by the fibers on the surface. This results in a reduction in the surface electrical resistance of the liner sheet of this invention. According to this invention, therefore, the generation of static charge by friction can be effectively prevented, and any adverse effect of the antistatic agent on the low friction coefficient of the sheet surface can be minimized. If a large amount of the antistatic agent is included in the surface layer from the outset together with the lubricant, the frictional characteristics of the surface are deteriorated by the effect of the antistatic agent. Furthermore, because the liner sheet of the invention has a low-friction surface, and the fibers in its surface layer are bonded as a result of heat melting, napping of the sheet surface can be very effectively prevented. The aforesaid characteristics are especially outstanding when the surface of the sheet has a coefficient of dynamic friction of not more that 0.35, and/or an electric resistance of not more than $1 \times 10^9$ ohms.

The fibrous sheets used as starting material in this invention include short fiber webs (card webs) prepared by a wet or dry method, and long fiber webs prepared by a spun bond method, a tow spreading method, and a burst fiber method. Various types of fibers suitable for a given method of production can be used either alone or as mixtures as the starting fibers. In view of the need for melt bonding fibers, the starting fibers should contain at least 50% by weight, preferably at least 75% by weight, of thermoplastic synthetic fibers.

The burst fiber method, as referred to above, is a method of making an unopened reticulated fibrous sheet by extruding a molten thermoplastic polymer containing a foaming agent from a die having a slit aperture with a width of 0.03 to 1.5 mm, preferably 0.06 to 0.5 mm, and drawing the extrudate at a draw ratio between the maximum draw ratio possible under the operating conditions and one third thereof while quenching it in the vicinity of a die exit (for example, within 5 mm of the die exit). This method is disclosed in detail in British Patent Specification No. 1,037,951. The unopened reticulated fibrous sheet possess numerous discontinuous cracks or splits in the direction of drawing, and consist of numerous extremely fine fibers lying in one direction and very finely spaced from each other, but forming a reticulated structure. In other words, the fibers in the structure are not spread apart and separated. The structure are valuable for various uses as they are. For instance, at least two of the unopened, sheet-formed and reticulated fibrous structures may be assembled with the direction of their cracks parallel, pulled in the direction perpendicular to the direction of cracks, and so extended. In this way, the sheets are opened and made into a physically uniform, reticulated structure, the contact area and entanglement between the sheets being remarkably increased. The structures are further pressed to fix the entanglement between the sheets, and to provide non-woven fabric having high strength not only in the direction of the cracks in the constituent sheets but also perpendicular thereto. The opening of the sheet-formed fibrous structures can be effected using apparatus conventionally used for lateral extension of synthetic resin film, such as a pin or clip tentering machine. The opening ratio is variable depending on the intended use of the product, but will normally be 3 to 15 times.

Polymers for the thermoplastic synthetic fibers may be any types which can form a fibrous sheet. Non-limitative examples include polyolefins such as polypropylene and polyethylene; polyesters such as polyethylene terephthalate, polybutylene terephthalate and polyethylene terephthalate isophthalate; polyamides such as nylon 6, nylon 66 and nylon 12; polystyrene; polycarbonate; polyvinyl chloride; blends of these polymers; and copolymers derived from the monomeric units of these polymers. In view of the various characteristics required of the liner sheet, polypropylene, polystyrene, polyethylene, polyamides and polyesters are preferred.

The lubricant is a highly lubricating substance capable of reducing the coefficient of friction of the sheet surface, and includes, for example, graphite, molybdenum disulfide, boron nitride, fluorinated graphite, and silicone, which may be used alone or as mixtures. It may be used together with an amount of a binder which does not impair its lubricating property. In contrast, higher alcohols, higher fatty acids or esters thereof, metal soaps, etc., which are generally used as external lubricants in the fabrication of plastics, are not desirable because they tend to develop a blooming phenomenon with the passage of time, and are likely to exert a chemical action on other materials with which the liner sheet will make contact.

Application of the lubricant is best performed by coating or impregnating the fibrous sheet with the lubricant. Alternatively, the fibrous sheet may be prepared from a polymer containing the lubricant.

The antistatic agent may be any of anionic, cationic, and nonionic antistatic agents generally used for textile application. The greatest effect of the antistatic agent is exhibited when it is coated or impregnated on or in the fibrous sheet as is the case with the lubricant.

Sheet lamination can be performed by sandwiching a fibrous sheet having the antistatic agent applied thereto between fibrous sheets having the lubricant applied thereto. This method is very effective for reducing the coefficient of friction and the electric resistance of the resulting liner sheet.

Heat-melting of the sheet is preferably performed by using a roll in order to impart smoothness to the surface of the final liner sheet product of the invention. The temperature of the roll surface must be maintained at a point higher than the softening point of the thermoplastic synthetic fibers. When at this time, the laminate is hot-pressed by using a pair of nip rollers, the resulting liner sheet will have a paper-like compact structure. When the laminate is passed along the roller surface under no pressure, the resulting liner sheet will take a soft bulky structure. The choice between these methods depends on the end use of the liner sheet. This heat-treatment results in bonding of at least those thermoplastic synthetic fibers which are in the surface layer of the resulting liner sheet. Hence, the liner sheet is free from napping, and has a superior surface smoothness. Furthermore, since a part of the lubricant is enclosed in the thermoplastic synthetic fibers which have been melted by the heat-treatment, the lubricating effect of the sheet surface is long-lasting. Another effect brought about by this heat-treatment is the decrease of the electrical resistance of the sheet surface. This is presumably because the antistatic agent present originally in the inner layer of the sheet partly migrates to the vicinity of the sheet surface by the effect of heat, and reaches fine depressions formed on the surface of the resulting liner sheet, as stated hereinabove.

The present invention will now be described with reference to its preferred embodiments taken in conjunction with the accompanying drawings in which.

Figure 1:
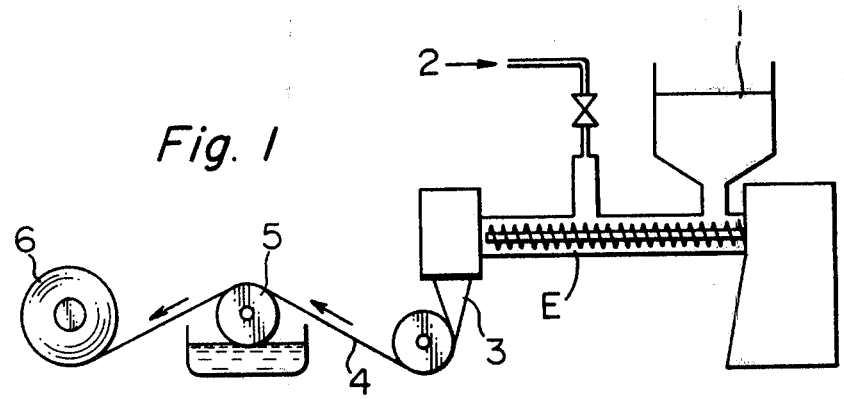
FIG. 1 is a side elevation which schematically shows a process comprising preparing a fibrous sheet by the burst fiber method described hereinabove, and applying a lubricant or antistatic agent to the sheet.

In one embodiment of this invention, chips 1 of thermoplastic synthetic polymer and an inert gas 2 gas are introduced into an extruder E from feed openings, as shown in FIG. 1. The chips are uniformly melted and kneaded, and extruded from a die 3 having a slit. The extrudate is taken up at a constant high draft ratio while being quenched by application of cooling air. A web 4 is thus obtained which has numerous discontinuous cracks in one direction (in the direction of take-up). Subsequently, a lubricant or antistatic agent is applied to the web 4 by an oiling roller 5, and the web 4 is wound up as a fibrous sheet 6.

Figure 2:
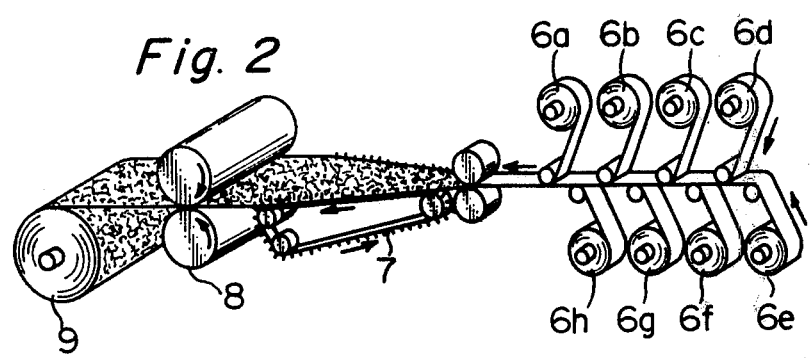
FIG. 2 is a perspective view which shows a process for producing the liner sheet of this invention by laminating fibrous sheets obtained by the process shown in FIG. 1, spreading the laminate in the widthwise direction, and hot-pressing it.

Then, as shown in FIG. 2, lubricant-applied fibrous sheets 6a, 6b, 6g and 6h obtained by the process of FIG. 1 are superimposed so as to sandwich antistatic agent-applied fibrous sheets 6c, 6d, 6e and 6f, and extended in the widthwise direction by a pin tenter 7 to form a sheet structure consisting of randomly laid fibers. The sheet structure is passed between hot-press rollers 8 to melt-bond the fibers, and wound up as a liner sheet product 9 of the invention.

Figure 3:
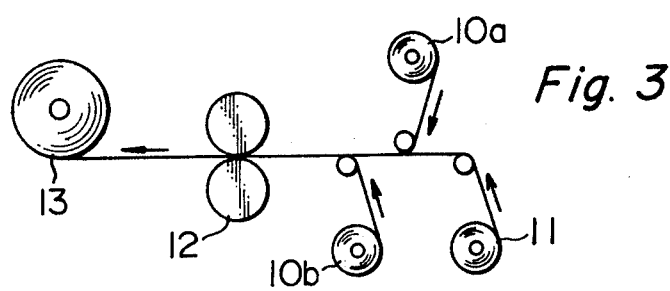
FIG. 3 is a side elevation showing a process for producing the liner sheet of the invention by using fibrous sheets prepared by the card web method.

In another embodiment of the invention as shown in FIG. 3, a card web 11 having an antistatic agent applied thereto is sandwiched by card webs 10a and 10b having a lubricant applied thereto. The assembly is then passed between hot-press rollers 12 to melt bond the fibers, and wound up as a liner sheet product 13.

The liner sheet of this invention has superior lubricity, dimensional stability, light weight and abrasion resistance, and causes little noises during the running of a magnetic tape. Accordingly, it is very suitable for application as a shim for magnetic tape cartridges as compared with conventional products. In addition, since the liner sheet of the invention can be produced by utilizing conventional manufacturing processes for non-woven webs, the productivity and the cost of production are equivalent to those in the production of paper-based shims. Furthermore, the cost of production is far lower than in the production of conventional fluorocarbon resin-based shims.

The following Examples and Comparative Examples illustrate the present invention more specifically. In these examples, all percentages are by weight.

EXAMPLE 1 AND COMPARATIVE EXAMPLES 1 TO 3

Chips of polypropylene having a melt index of 8.0 were melted and kneaded at 250° C. while a nitrogen gas was introduced at a pressure of 80 kg/cm². The molten polymer was extruded from a die having a ring-like slit with a width of 0.23 mm and a diameter of 160 mm. While cooling air was being blown against the molten polymer at the die exit to quench the extrudate to 45° C., the extrudate was taken up at a draft ratio of 100. An unopened reticulated fibrous sheet was obtained which had numerous discontinuous cracks in one direction (the sheet is designated as sheet A).

A 16% aqueous solution of Electron Stripper K (an antistatic agent made by Kao Atlas Co., Ltd.) was applied to the sheet A at a rate of 27 parts by weight per 100 parts by weight of sheet A. The resulting sheet is designated as sheet B.

Two sheets B were superimposed, and two sheets A were placed above and below these sheets B. These six sheets were made into a laminate sheet having a width of 10.5 cm and extended to 8 times in the widthwise direction to spread and separate the constituent fibers of sheets A and B of the laminate sheet. Thus, a sheet structure composed by randomly laid fibers was obtained. The sheet structure was passed through a pair of hot-press rollers heated at 170 to 175° C. to melt-bond the fibers, and to form a non-woven sheet with a thickness of about 0.1 mm. Both surfaces of the non-woven sheet had been smoothed by application of a silicone emulsion at the time of forming the laminate sheet.

Figure 4:
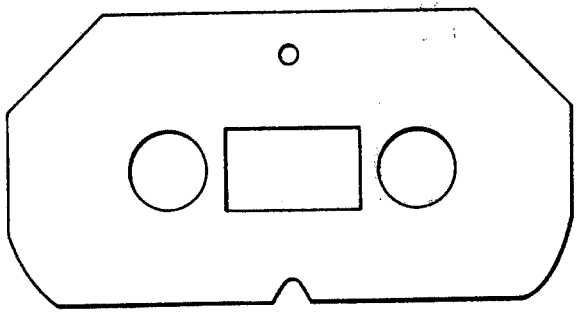
FIG. 4 is a top plan showing one example of the shape of a shim punched out from the liner sheet of this invention for insertion in a magnetic tape cartridge.

A shim of the specified shape shown in FIG. 4 was punched out from the resulting non-woven sheet (the liner sheet of the invention). The shim was tested for the various properties shown in Table 1, and the results are shown in Table 1.

For comparison, the same test were conducted on (1) a shim prepared from a sheet which was obtained by subjecting a non-woven fabric consisting only of regenerated fibers to the same smoothing treatment as described above (Comparative Example 1), (2) a commercially available shim prepared from smoothed paper (Comparative Example 2), and (3) a shim prepared from a polyethylene terephthalate film (Comparative Example 3). The results are also shown in Table 1.

Some of the properties shown in Table 1 to 5 were measured as follows:

The "coefficient of dynamic friction" is the self friction measured at a testing pressure of 3.3 g/cm² and a testing speed of 15 cm/min. in an atomsphere kept at 20° C. and 65% RH which conditions are substantially in line with ASTM D 1894-63.

The "surface electric resistance" is measured in an atomsphere kept at 20° C. and 40% RH.

The "abrasion resistance" is rated as Good, Slightly poor, and Poor.

The "wow or flutter value", which is a measure of the frictional resistance of a shim, is measured by a wow and flutter meter.

The "noise" refers to a noise which occurs when operating a magnetic tape cartridge having the shim fitted in it, and is measured by a precise noise meter at 27° C. and 65 RH.

Table 1

| Properties | Ex. 1 | Comparative Ex. 1 | Comparative Ex. 2 | Comparative Ex. 3 |
| --- | --- | --- | --- | --- |
| Thickness (μ) | 118 | 120 | 70 | 100 |
| Specific gravity ratio | 0.72 | 0.80 | 0.90 | 1.0 |
| Air flow resistance (cm Aq/mm) | 100 | 160 | >200 | >200 |
| Coefficient of dynamic friction | 0.14 | 0.66 | 0.21 | 0.45 |
| Surface electric resistance (ohms) | $8 \times 10^7$ | $9 \times 10^8$ | $9 \times 10^8$ | $>1 \times 10^{12}$ |
| Abrasion resistance | Good | Poor | Poor | Good |
| Wow or flutter value | 0.12 | 0.13 | 0.15 | 0.15 |
| Noise (dB) | 11 | 19 | 15 | 16 |

EXAMPLE 2

In the process shown in FIG. 1, chips 1 of polypropylene having a melt index of 8.0 were melted and kneaded at 250° C. while introducing a nitrogen gas 2 at a pressure of 80 kg/cm². The molten polymer was extruded through a die 3 having a ring-like slit with a width of 0.25 mm and a diameter of 160 mm. While quenching the extrudate the 45° C. by blowing cooling air against the molten polymer at the die exit, the extrudate was taken up at a draft ratio of 100 to afford an unopened reticulated fibrous sheet 4 having numerous discontinuous cracks in one direction. By means of an oiling roller 5, 2% (calculated as the effective ingredient) of an antistatic agent composed to 10% of an alkyl phosphate-type surface-active agent and 90% of water, or 5% (calculated as the effective ingredient) of a lubricant composed of 80% of a dimethyl polysiloxane-type silicone emulsion and 20% of water was applied to the fibrous sheet, and wound up at a rate of 60 m/min. as a sheet 6 having a width of 10.5 cm. Each of the sheets obtained was dried for 48 hours in a dryer.

Eight sheets 6 were laminated so that four sheets 6a, 6b, 6g and 6h having the lubricant applied thereto sandwiched four sheets 6c, 6d, 6e and 6f having the antistatic agent applied thereto, in the manner shown in FIG. 2. The laminate sheet was extended to 10 times in the widthwise direction by a pin tenter 7 to spread and separate the constituent fibers of the sheets. Thus, a sheet structure composed of randomly laid fibers was obtained. The sheet structure was passed between a pair of hot-press rollers 8 kept at 170° to 175° C. to melt-bond the fibers. The resulting non-woven sheet 9 had a low electric resistance, and therefore, did not appreciably develop static charge. It was free from napping, and had a low coefficient of friction. Furthermore, since the sheet was essentially of a fibrous structure, it had superior acoustic characteristics. The various characteristics of the resulting sheet liner sheet are shonw in Table 2.

EXAMPLE 3

The procedure of Example 2 was repeated except that the melt-bonding treatment was performed by passing the sheet structure along the surface of a roller kept at 170° to 175° C. instead of using the hot-press roll method. The resulting bulky non-woven sheet had superior characteristics as shown in Table 2.

EXAMPLE 4

A lubricant of the following formulation was applied to a card web 10 consisting of 80% of black nylon 6 fibers (15 d × 46 mm) and 20% of black viscose rayon fibers (9 d ×38 mm) and having a basis weight of 20 g/m² in an amount of 10% (calculated as the effective ingredient).

| Formulation of the lubricant | |
|---|---|
| Molybdenum disulfide power | 40% |
| Acrylate ester-type emulsion | 10% |
| Silicone emulsion | 20% |
| Thickening agent | 5% |
| Water | 25% |

The same antistatic agent as used in Example 2 was applied to a card web 11 consisting of 40% of black nylon 6 fibers (15d ×46 mm) and 60μ of lack viscose rayon fibers (9 d ×38 mm) and having a basis weight of 35 g/m².

The treated card webs were superimposed so that the card webs 10a and 10b sandwiched the card web 11, as shown in FIG. 3. The assembly was passed through a pair of hot-press rollers 12 kept at 185° to 190° C. to melt-bond the fibers. The resulting black non-woven sheet 13 having a low coefficient of friction was superior as a liner sheet as shown in Table 2.

EXAMPLE 5

A non woven sheet was prepared in the same way as in Example 2 except that a mixture of equal amounts of the antistatic agent and the lubricant was applied to th fibrous sheet. The resulting non-woven sheet was superior as a liner sheet as shown in Table 2.

COMPARATIVE EXAMPLE 4

Example 4 was repeated except that the temperature of the hot-press rollers was changed to 135° to 140° C. The non-woven sheet obtained was insufficient in the melt-bonding of the fibers. Its coefficient of friction and abrasion resistance were poor as shown in Table 2, and naps were developed.

COMPARATIVE EXAMPLES 5 TO 7

Example 4 was prepared except that the application of the lubricant was omitted. The resulting non-woven sheet had a high coefficient of friction as shown in Table 2.

The various properties of the non-woven fabrics obtained in Examples 2 to 5 and Comparative Examples 4 and 5, a shim prepared from paper as used between a rotary body and a casing in conventional acoustic devices (Comparative Example 6) and an ordinary stretched polyester film (Comparative Example 7) were measured. The results are shown in Table 2.

Table 2

| Properties Sample | Thickness (μ) | Specific gravity ratio | Air flow resistance (cm Aq/mm) | Noise (dB) | Coefficient of dynamic friction | Surface electric resistance (ohms) | Abrasion resistance |
|---|---|---|---|---|---|---|---|
| Example 2 | 120 | 0.72 | 100 | 11 | 0.16 | $8 \times 10^7$ | Good |
| Example 3 | 148 | 0.58 | 43 | 12 | 0.23 | $2 \times 10^8$ | Good |
| Example 4 | 80 | 0.75 | 110 | 11 | 0.18 | $5 \times 10^7$ | Good |
| Example 5 | 120 | 0.70 | 75 | 13 | 0.40 | $6 \times 10^7$ | Good |
| Comparative Example 4 | 140 | 0.42 | 3 | 14 | 0.69 | $7 \times 10^7$ | Poor |
| Comparative Example 5 | 80 | 0.75 | 110 | 16 | 0.62 | $9 \times 10^7$ | Slightly poor |
| Comparative Example 6 | 70 | 0.90 | >200 | 15 | 0.20 | $9 \times 10^8$ | Poor |
| Comparative Example 7 | 100 | 1.0 | >200 | 16 | 0.44 | $>1 \times 10^{12}$ | Good |

EXAMPLE 6

A mixture of 100 parts of polypropylene, 5 parts of nylon 6 and 2 parts of molybdenum disulfide powder was continuously fed into an extruder through a feed opening. While introducing a nitrogen gas at a pressure of 80 mg/cm² from an opening located intermediate in the extruder, the mixture was extruded through a ring-like slit die with a width of 0.25 mm. The temperature of the extruder at this time was 280° C. The extruder from the die was immediately cooled by blowing air against it, and then taken up at draft ratio of 100. Sixty parts of a 30% silicone emulsion was applied continuously by a roller to 100 parts of the resulting unopened reticulated fibrous sheet having numerous discontinuous cracks, and then the fibrous sheet was wound up (the resulting sheet is designated as sheet C).

Separately, a mixture of 100 parts of polypropylene, 15 parts of nylon 6 and 1 part of molybdenum disulfide was extruded in the same way as above to form a fibrous sheet having cracks. 100 Parts of the resulting sheet was coated with 27 parts of a 16% aqueous solution of Electron Stripper K (an antistacic agent made by Kao Atlas C., Ltd.), and wound up (the resulting sheet is designated sheet D).

Six sheets C, 10 sheets D, and 6 sheets C were laminated in this order so that the sheets C sandwiched the sheets D. The resulting laminate sheet, 20 cm wide, was extended to 8 times in the widthwise direction by a pin tenter while overfeeding it by two times, and passed through a pair of hot-press rollers heated at 170° C. to afford a non-woven sheet having a thickness of 110 microns.

The apparent specific viscosity, air flow resistance, friction coefficient and electrical resistance of the resulting non-woven sheet were measured. The results are shown in Table 3.

A shim having the shape shown in FIG. 4 was punched out from the non-woven sheet, and mounted in a magnetic tape cartridge. Noise and sound quality were tested during the rapid running of a magnetic tape. The results are shown in Table 3.

EXAMPLE 7 AND COMPARATIVE EXAMPLES 8 AND 9

In the same way as in Example 6, the laminate sheet was extended, and passed through a pair of hot press rollers kept at 140°, 150° and 160° C. The same properties as in Example 6 of the resulting non-woven sheets were measured, and the results are shown in Table 3.

It is clear from the results that when the temperature of the rollers is low, both the friction resistance and the noise increase.

Table 3

| Properties | Example 6 | Example 7 | Comparative Example 8 | Comparative Example 9 |
|---|---|---|---|---|
| Hot-pressing temperature | 170 | 160 | 150 | 140 |
| Specific gravity ratio | 0.71 | 0.68 | 0.53 | 0.45 |
| Air flow resistance (cm Aq/mm) | 100 | 62.6 | 30.0 | 4.0 |
| Coefficient of dynamic friction | 0.16 | 0.18 | 0.24 | 0.60 |
| Surface electric resistance (ohms) | $8 \times 10^7$ | $8 \times 10^7$ | $1 \times 10^8$ | $2 \times 10^8$ |
| Abrasion resistance | Good | Good | Slightly poor | Poor |
| Thickness ($\mu$) | 110 | 114 | 147 | 174 |
| Noise (dB) | 11 | 11 | 13 | 14 |
| Wow or flutter value | 0.12 | 0.12 | 0.15 | 0.16 |

EXAMPLE 8 AND COMPARATIVE EXAMPLE 10

Example 6 was repeated except that the sheet was not passed through the hot-press rollers, but passed through a heating zone in which the atomsphere was maintained at 180° C. by an infrared induction heater while holding both ends of the sheet. The properties of the resulting non-woven sheet are shown in Table 4.

The same test was performed by using a heating zone in which the atomsphere was maintained at 190° C. The results are shown in Table 4. The resulting non-woven fabric had a high apparent specific gravity, and therefore wow and flutter and noises increased.

Table 4

| Properties | Example 8 | Comparative Example 10 |
|---|---|---|
| Thickness ($\mu$) | 130 | 100 |
| Specific gravity ratio | 0.66 | 0.86 |
| Air flow resistance (cm Aq/mm) | 60 | >200 |
| Coefficient of dynamic friction | 0.18 | 0.35 |
| Surface electric resistance (ohms) | $8 \times 10^7$ | $5 \times 10^8$ |
| Abrasion resistance | Good | Good |
| Noise (dB) | 11 | 14 |
| Wow or flutter value | 0.11 | 0.14 |

EXAMPLES 9 AND 10

The procedure of Example 6 was repeated except that the numbers of sheets C and D were changed as shown in Table 5. The properties of the non-woven sheets are shown in Table 5.

Table 5

| Properties | Example 9 | Example 10 |
|---|---|---|
| Number of sheets C | 10 | 20 |
| Number of sheet D | 7 | 18 |
| Thickness ($\mu$) | 85 | 183 |
| Coefficient of dynamic friction | 0.18 | 0.20 |
| Surface electric resistance (ohms) | $9 \times 10^8$ | $7 \times 10^8$ |
| Abrasion resistance | Good | Good |
| Noise (dB) | 12 | 11 |
| Air flow resistance (cm Aq/mm) | 100 | 52 |
| Specific gravity ratio | 0.71 | 0.60 |
| Wow or flutter value | 0.13 | 0.11 |

What we claim is:

1. A liner sheet for a magnetic tape cartridge, said sheet being a fibrous sheet containing thermoplastic synthetic fibers with at least those fibers which are in its surface layer being bonded as a result of heat melting, said fibrous sheet having (1) an apparent specific gravity 0.55 to 0.85 time the specific gravity of the polymer constituting the fibers, (2) air permeability expressed by a pressure drop of not more than 200 cm Aq/mm when air is caused to flow at a speed of 10 cm/sec in a direction perpendicular to the surface of the sheet and (3) a thickness of 50 to 300 microns, and said fibrous sheet containing in its structure a lubricant and an anti-static agent dispersed therein.

2. The liner sheet of claim 1 wherein the lubricant is dispersed mainly in the surface layer of the structure of the fibrous sheet and the antistatic agent is dispersed mainly in its inner layer.

3. The liner sheet of claim 1 wherein at least one surface has a coefficient of dynamic friction of not more than 0.35.

4. The liner sheet of claim 1 wherein at least one surface has a coefficient of dynamic friction of not more than 0.20.

5. The liner sheet of claim 1 which has a surface electric resistance of not more than $1 \times 10^9$ ohms.

6. The liner sheet of claim 1 wherein the fibrous sheet contains at least 50% by weight of the thermoplastic synthetic fibers.

7. The liner sheet of claim 1 wherein the thermoplastic synthetic fibers are fibers of polypropylene, polystyrene, polyethylene, a polyamide or a polyester.

8. The liner sheet of claim 1 wherein the fibrous sheet is prepared by interposing a fibrous sheet having the antistatic agent applied thereto between fibrous sheets having the lubricant applied thereto, and hot-pressing the laminate of a sandwich structure.

9. A process for producing a liner sheet for a magnetic tape cartridge, said sheet being a fibrous sheet containing thermoplastic synthetic fibers with at least those fibers which are in its surface layer being bonded as a result of heat melting, said fibrous sheet having (1) an apparent specific gravity 0.55 to 0.85 time the specific gravity of the polymer constituting the fibers, (2) air permeability expressed by a pressure drop of not more than 200 cm Aq/mm when air is caused to flow at a speed of 10 cm/sec in a direction perpendicular to the surface of the sheet and (3) a thickness of 50 to 300 microns, and said fibrous sheet containing in its structure a lubricant and an anti-static agent dispersed therein; which comprises interposing a fibrous sheet containing thermoplastic synthetic fibers and having the antistatic agent applied thereto between fibrous sheets containing thermoplastic synthetic fibers and having the lubricant applied thereto, and hot-pressing the resulting laminate to melt-bond at least those fibers which are in the surface layer of the laminate.

10. The process of claim 9 wherein the hot-pressing is performed by rolls maintained at a temperature higher than the softening point of the thermoplastic synthetic fibers.

11. A process for producing a liner sheet for a magnetic tape cartridge, said sheet being fibrous sheet containing thermoplastic synthetic fibers with at least those fibers which are in its surface layer being bonded as a result of heat melting, said fibrous sheet having (1) an apparent specific gravity 0.55 to 0.85 time the specific gravity of the polymer constituting the fibers, (2) air permeability expressed by a pressure drop of not more than 200 cm Aq/mm when air is caused to flow at a speed of 10 cm/sec in a direction perpendicular to the surface of the sheet and (3) a thickness of 50 to 300 microns, and said fibrous sheet containing in its structure a lubricant and an anti-static agent dispersed the resin; which comprises i. extruding a molten thermoplastic polymer containing a foaming agent through a die, and drawing the extrudate at a draw ratio between the maximum draw ratio possible under the operating conditions and one third thereof while quenching it in the vicinity of the die exit, thereby to form unopened reticulated fibrous sheets, ii. interposing the unopened reticulated fibrous sheet to which the lubricant has been applied between the unopened reticulated fibrous sheets to which the anti-static agent has been applied to form a laminate sheet of a sandwich structure, iii). extending the laminate sheet in the widthwise direction to spread and separate the constituent fibers of the unopened reticulated fibrous sheets of the laminate to form a sheet structure composed of randomly laid fibers, and iv). hot-pressing the sheet structure to melt-bond at least those fibers which are in its surface layer.

* * * * *